United States Patent
Sadiq et al.

(10) Patent No.: US 11,327,140 B2
(45) Date of Patent: May 10, 2022

(54) BEAM INDEX AND LINK INDEX DEPENDENT SEQUENCE GENERATION FOR POSITIONING BEACON

(71) Applicant: QUALCOMM Incorporated, San Diego, CA (US)

(72) Inventors: Bilal Sadiq, Basking Ridge, NJ (US); Alexandros Manolakos, San Diego, CA (US); Naga Bhushan, San Diego, CA (US); Joseph Binamira Soriaga, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 16/508,921

(22) Filed: Jul. 11, 2019

(65) Prior Publication Data

US 2020/0025853 A1    Jan. 23, 2020

(30) Foreign Application Priority Data

Jul. 19, 2018  (GR) ............................... 20180100331

(51) Int. Cl.
  *G01S 1/04*      (2006.01)
  *H04W 64/00*   (2009.01)
  (Continued)

(52) U.S. Cl.
  CPC ........ *G01S 1/0428* (2019.08); *H04L 27/2613* (2013.01); *H04W 16/28* (2013.01); *H04W 48/12* (2013.01); *H04W 64/00* (2013.01)

(58) Field of Classification Search
  CPC ..... G01S 1/0428; H04W 64/00; H04W 16/28; H04W 48/12; H04L 27/2613
  See application file for complete search history.

(56) References Cited

U.S. PATENT DOCUMENTS

2018/0176065 A1* 6/2018 Deng ..................... H04B 7/088
2019/0223043 A1* 7/2019 Geng .................... H04L 5/0051
(Continued)

FOREIGN PATENT DOCUMENTS

| EP | 3249825 A1 | 11/2017 |
| EP | 3389319 A1 | 10/2018 |
| WO | 2017097033 A1 | 6/2017 |

OTHER PUBLICATIONS

"3rd Generation Partnership Project, Technical Specification Group Radio Access Network, Evolved Universal Terrestrial Radio Access (E-UTRA), Physical Channels and Modulation (Release 15)", 3GPP Standard, Technical Specification, 3GPP TS 36.211, 3rd Generation Partnership Project (3GPP), Mobile Competence Centre, 650, Route Des Lucioles, F-06921 Sophia-Antipolis Cedex, France, vol. RAN WG1, No. V15.2.0, Jul. 5, 2018 (Jul. 5, 2018), XP051474770, pp. 94-186, [retrieved on Jul. 5, 2018] paragraph 6.10.4.1 paragraph 7.2.

(Continued)

*Primary Examiner* — Thomas M Hammond, III
(74) *Attorney, Agent, or Firm* — Qualcomm Incorporated

(57) ABSTRACT

Disclosed are techniques for generating a positioning beacon sequence suitable for use in a wireless network that utilizes beamformed communication. More particularly, the positioning beacon sequence may be generated based on a first sequence that depends on a link identifier and does not depend on a beam index assigned to a beam used to transmit the positioning beacon in combination with a second sequence that depends on the beam index and does not depend on the link identifier. For example, the first sequence and the second sequence may be XORed to obtain the final beacon sequence, or the first sequence and the second sequence may be modulated and multiplied to obtain the final beacon sequence. Furthermore, in practice, the beacon sequence may be generated using a pseudo-random (Continued)

sequence generator initialized with a seed in which the link identifier and the beam index are treated as separate subcomponents.

30 Claims, 7 Drawing Sheets

(51) Int. Cl.
*H04L 27/26* (2006.01)
*H04W 16/28* (2009.01)
*H04W 48/12* (2009.01)

(56) References Cited

U.S. PATENT DOCUMENTS

| | | | |
|---|---|---|---|
| 2019/0288766 A1* | 9/2019 | Ng | H04B 7/0404 |
| 2019/0373602 A1* | 12/2019 | Qin | H04W 72/04 |
| 2019/0387412 A1* | 12/2019 | Kim | H04W 74/0816 |
| 2020/0169446 A1* | 5/2020 | Chen | H04B 7/0695 |

OTHER PUBLICATIONS

International Search Report and Written Opinion—PCT/US2019/041675—ISA/EPO—dated Oct. 25, 2019.
QUALCOMM Incorporated: "PRS Sequence Generation and Value Range for PRS-ID", 3GPP Draft, 3GPP TSG-RAN WG1 Meeting #86, R1-166290 (Value Range for PRS-ID), 3rd Generation Partnership Project (3GPP), Mobile Competence Centre, 650, Route Des Lucioles, F-06921 Sophia-Antipolis Cedex France, vol. RAN WG1, No. Gothenburg, Sweden, Aug. 22, 2016-Aug. 26, 2016, Aug. 21, 2016 (Aug. 21, 2016), XP051125316, pp. 1-6, Retrieved from the Internet: URL:http://www.3gpp.org/ftp/Meetings_3GPP_SVNC/RAN1/Docs/ [retrieved on Aug. 21, 2016]p. 2.
VIVO: "Discussion on DL RS for NR Positioning", 3GPP Draft, 3GPP TSG RAN WG1 #97, R1-1906177, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 1, 2019 (May 1, 2019), XP051708216, 8 Pages, Retrieved from the Internet: URL:http://www.3gpp.org/ftp/tsg%5FranjWG1%5FRL1/TSGR1%5F97/Docs/R1%2D1906177%2Ezip [retrieved on May 1, 2019] paragraph 2.4.

* cited by examiner

BEAM INDEX AND LINK INDEX DEPENDENT SEQUENCE GENERATION FOR POSITIONING BEACON

CROSS-REFERENCE TO RELATED APPLICATION

The present application for patent claims priority under 35 U.S.C. § 119 to Greek Patent Application No. 20180100331, entitled "BEAM INDEX AND LINK INDEX DEPENDENT SEQUENCE GENERATION FOR POSITIONING BEACON," filed Jul. 19, 2018, assigned to the assignee hereof, and expressly incorporated herein by reference in its entirety

TECHNICAL FIELD

Various aspects described herein generally relate to methods for generating a positioning beacon sequence that ensures identical interference randomization regardless of which beam index is assigned to a beam used to transmit the positioning beacon.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 millimeter (mm) to 10 mm, or 30 to 300 gigahertz (GHz)). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 decibels (dBs), relative to that observed in either the 2.4 GHz, or 5 GHz bands.

Propagation loss is also an issue in multiple input-multiple output (MIMO) and massive MIMO systems in any band. The term MIMO as used herein generally refers to both MIMO and massive MIMO. MIMO is a method to multiply the capacity of a radio link by using multiple transmit and receive antennas to exploit multipath propagation, which occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than a single RF signal would be sent, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, the RF signal is broadcasted in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). However, the unique challenges of heavy path-loss faced by mmW communication systems necessitate new techniques which are not present in 3G and/or 4G wireless communication systems. Accordingly, there may be a need to enhance positioning methods that are traditionally used in wireless networks to take into account the unique challenges that may arise with beamformed communication.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

According to various aspects, disclosed herein are certain techniques for generating a positioning beacon sequence suitable for use in a wireless network that utilizes beamformed communication. More particularly, the positioning beacon sequence may be generated based on a first sequence that depends on a link identifier and does not depend on a beam index assigned to a beam used to transmit the positioning beacon in combination with a second sequence that depends on the beam index and does not depend on the link identifier. For example, the first sequence and the second sequence may be XORed to obtain the final beacon sequence, or the first sequence and the second sequence may be modulated and multiplied to obtain the final beacon sequence. Furthermore, in practice, the beacon sequence may be generated using a pseudo-random sequence generator initialized with a seed in which the link identifier and the beam index are treated as separate subcomponents.

According to various aspects, a method for generating a positioning beacon sequence may comprise determining a first sequence associated with a positioning beacon, wherein the first sequence is dependent on a link identifier and independent of a beam index assigned to a beam used to transmit the positioning beacon, determining a second sequence associated with the positioning beacon, wherein the second sequence is dependent on the beam index assigned to the beam used to transmit the positioning beacon and independent of the link identifier, generating the positioning beacon sequence based on the first sequence and the second sequence, and performing a positioning operation using the positioning beacon sequence.

According to various aspects, an apparatus may comprise a memory and at least one processor coupled to the memory, wherein the memory and the at least one processor may be configured to determine a first sequence and a second sequence associated with a positioning beacon, the first sequence dependent on a link identifier and independent of a beam index assigned to a beam used to transmit the positioning beacon, the second sequence dependent on the beam index and independent of the link identifier, generate a positioning beacon sequence based on the first and second sequences, and perform a positioning operation using the positioning beacon sequence.

According to various aspects, an apparatus may comprise means for determining a first sequence associated with a positioning beacon, wherein the first sequence is dependent on a link identifier and independent of a beam index assigned to a beam used to transmit the positioning beacon, means for determining a second sequence associated with the positioning beacon, wherein the second sequence is dependent on the beam index assigned to the beam used to transmit the positioning beacon and independent of the link identifier, means for generating a positioning beacon sequence based on the first sequence and the second sequence, and means for performing a positioning operation using the positioning beacon sequence.

According to various aspects, a computer-readable storage medium may have computer-executable instructions recorded thereon, wherein the computer-executable instructions may be configured to cause a processor to determine a first sequence associated with a positioning beacon, the first sequence dependent on a link identifier and independent of a beam index assigned to a beam used to transmit the positioning beacon, determine a second sequence associated with the positioning beacon, the second sequence dependent on the beam index assigned to the beam used to transmit the positioning beacon and independent of the link identifier, generate the positioning beacon sequence based on the first and second sequences, and perform a positioning operation using the positioning beacon sequence.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
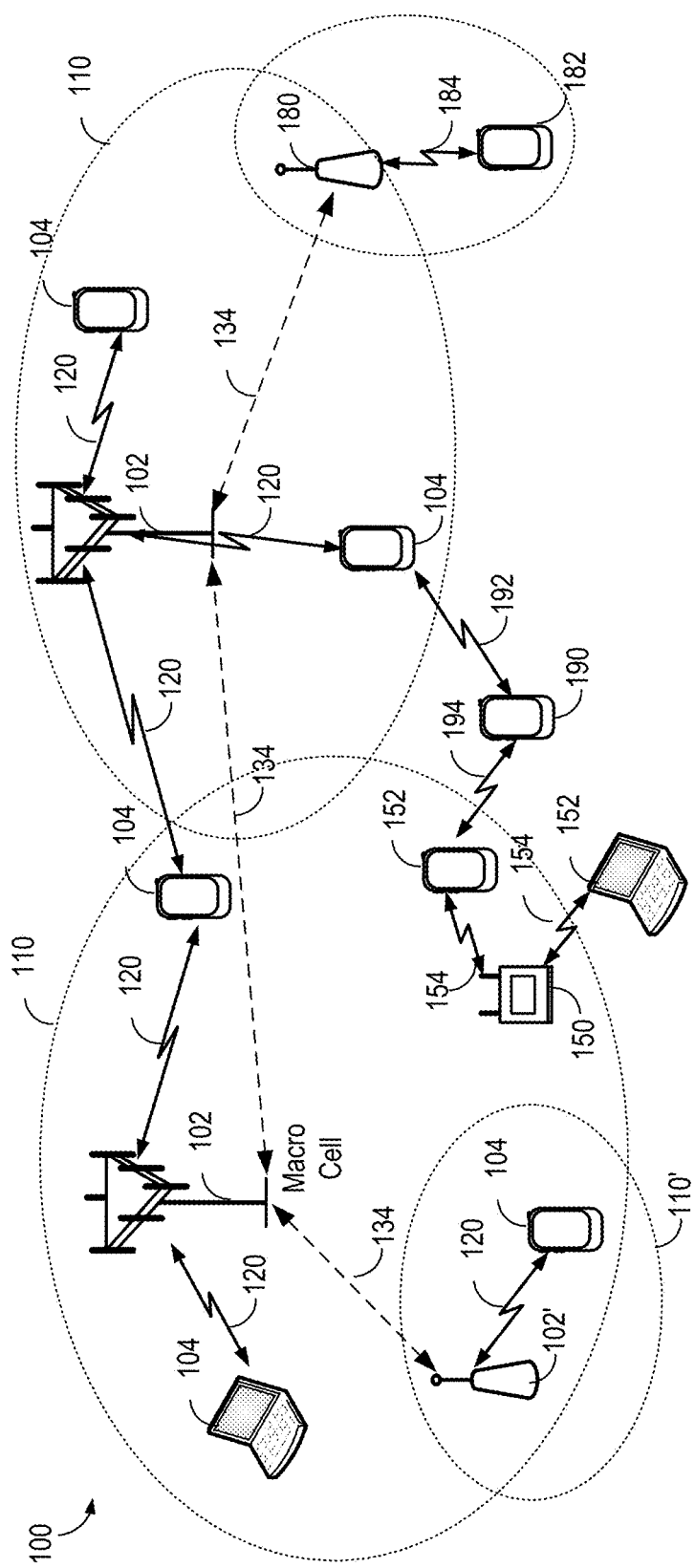
FIG. 1 illustrates an exemplary wireless communications system, according to various aspects of the disclosure.

Various aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspect" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, wearable devices, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100, which may also be referred to as a wireless wide area network (WWAN), may include various base stations 102 and various UEs 104. The base stations 102 may include macro cell base stations (high power cellular base stations) and/or small cell base stations (low power cellular base stations). The macro cell base stations may include Evolved NodeBs (eNBs) where the wireless communications system 100 corresponds to an LTE network, gNodeBs (gNBs) where the wireless communications system 100 corresponds to a 5G network, and/or a combination thereof, and the small cell base stations may include femtocells, picocells, microcells, etc.

The base stations 102 may collectively form a RAN and interface with an evolved packet core (EPC) or next generation core (NGC, also abbreviated "5GC") through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104 over one or more logical communication entities referred to as "cells." A cell may be associated with an identifier for distinguishing neighboring cells (e.g., a physical cell identifier (PCID), a virtual cell identifier (VCID)) operating via the same or a different carrier frequency (also referred to as a "component carrier" or simply a "carrier"). In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. Each of the base stations 102 may provide communication coverage for a respective geographic coverage area 110. In some cases, the term "cell" may refer to a portion of a geographic coverage area 110 (e.g., a sector) over which the logical entity operates. Thus, as used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 mm and 10 mm. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
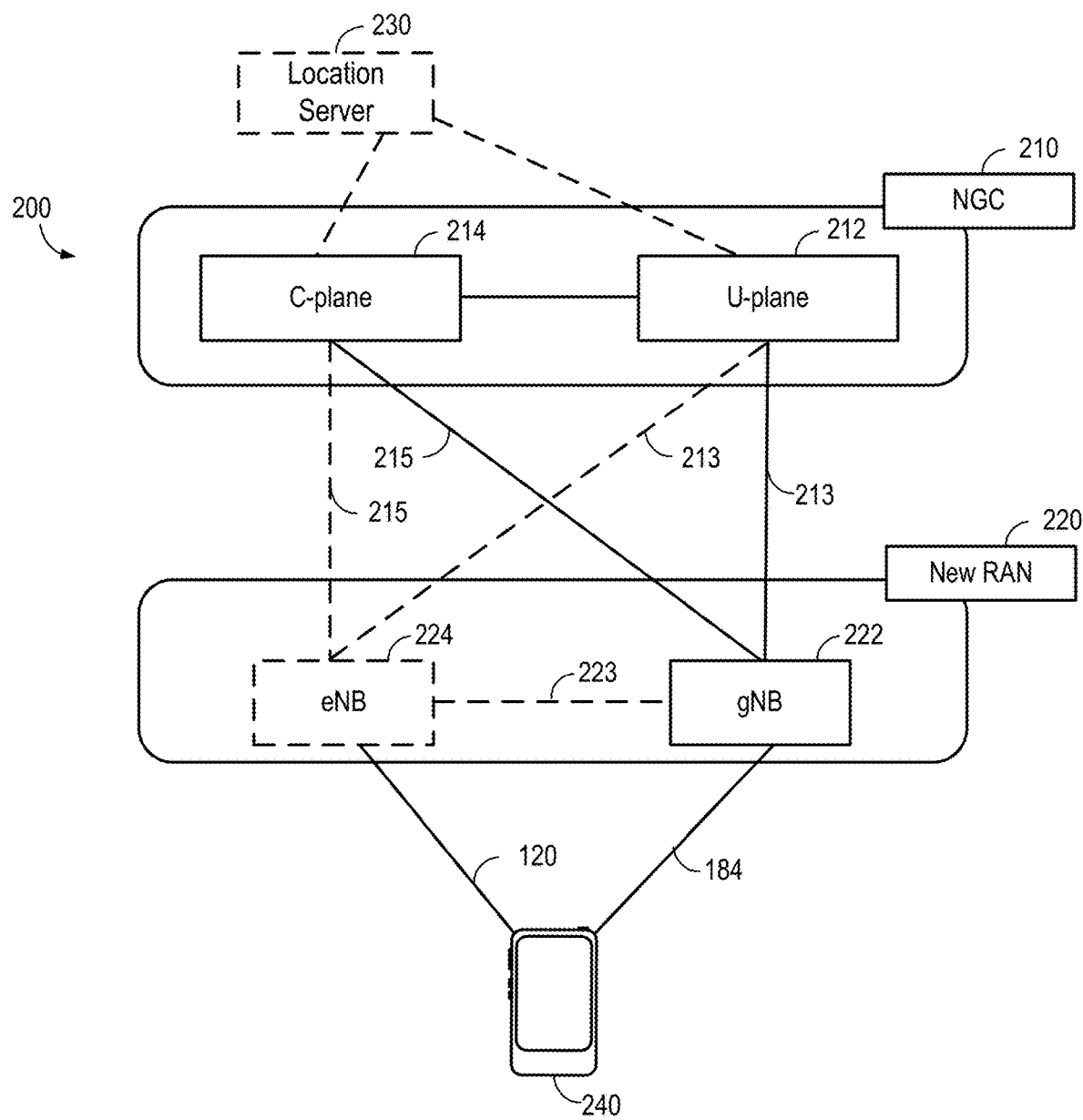
FIGS. 2A and 2B illustrate example wireless network structures, according to various aspects of the disclosure.

According to various aspects, FIG. 2A illustrates an example wireless network structure 200. For example, an NGC 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
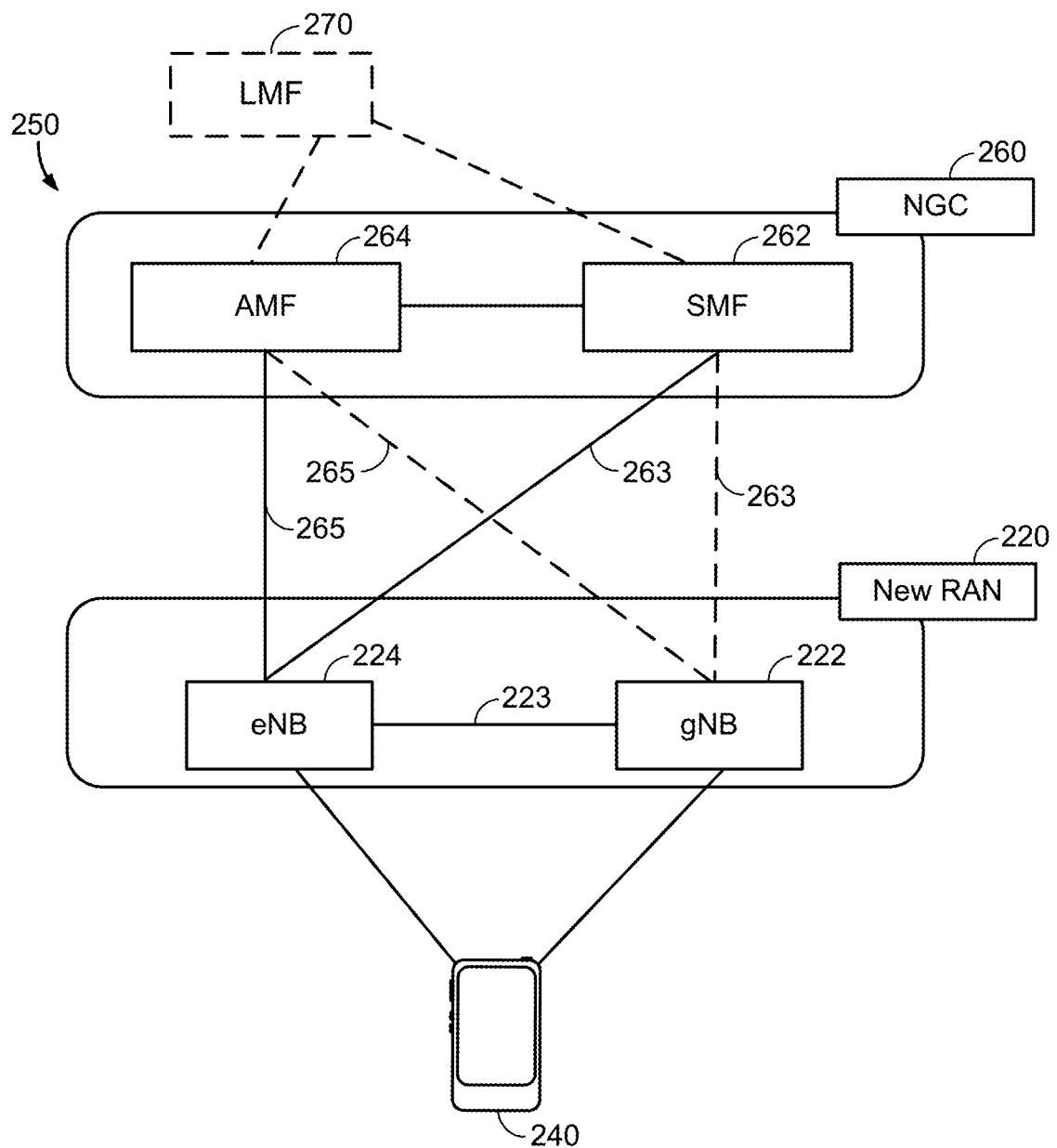

According to various aspects, FIG. 2B illustrates another example wireless network structure 250. For example, an NGC 260 can be viewed functionally as control plane functions, provided by an access and mobility management function (AMF) 264, and user plane functions, provided by a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3:
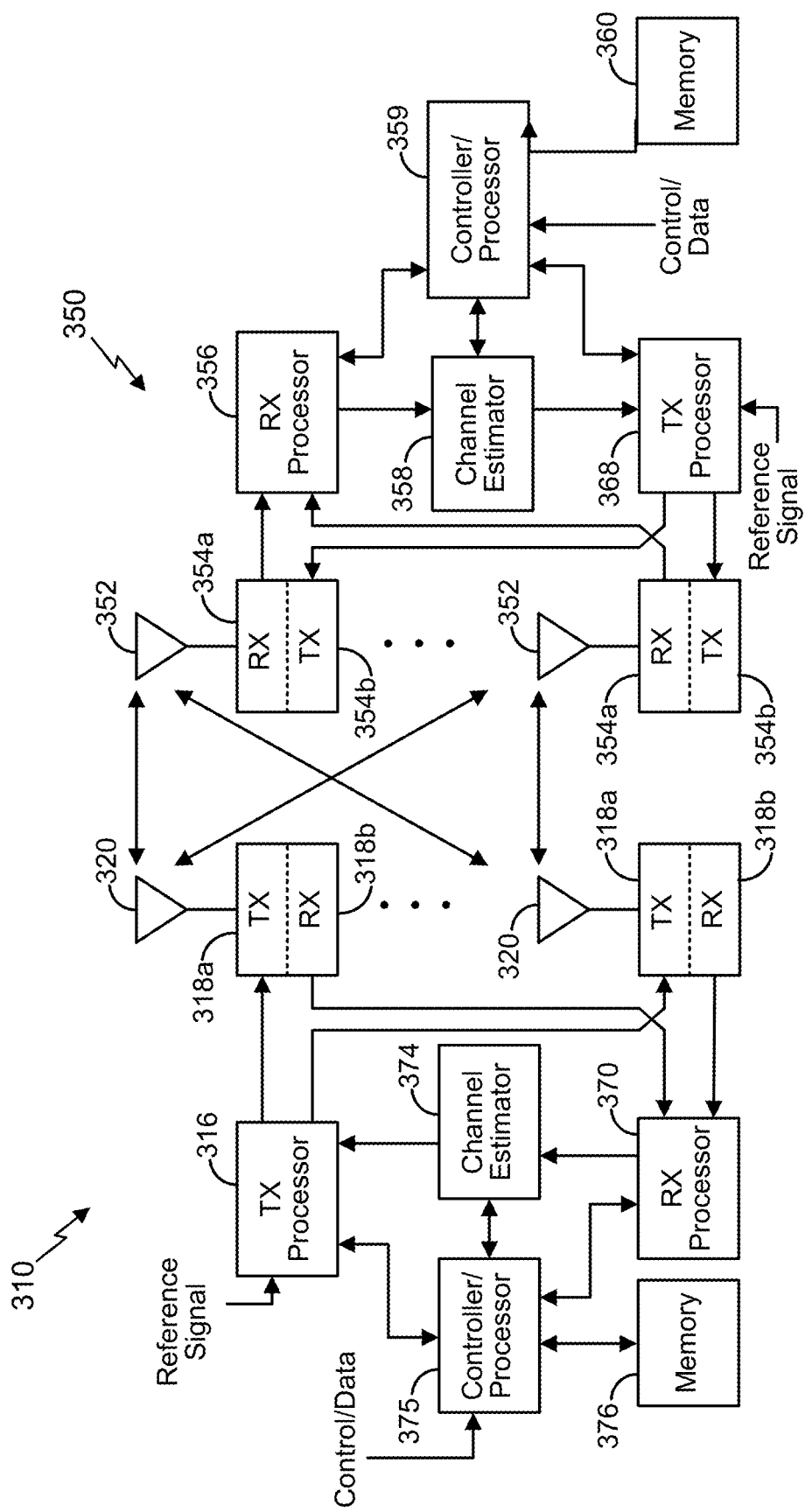
FIG. 3 illustrates an exemplary base station and an exemplary UE in an access network, according to various aspects of the disclosure.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/NGC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
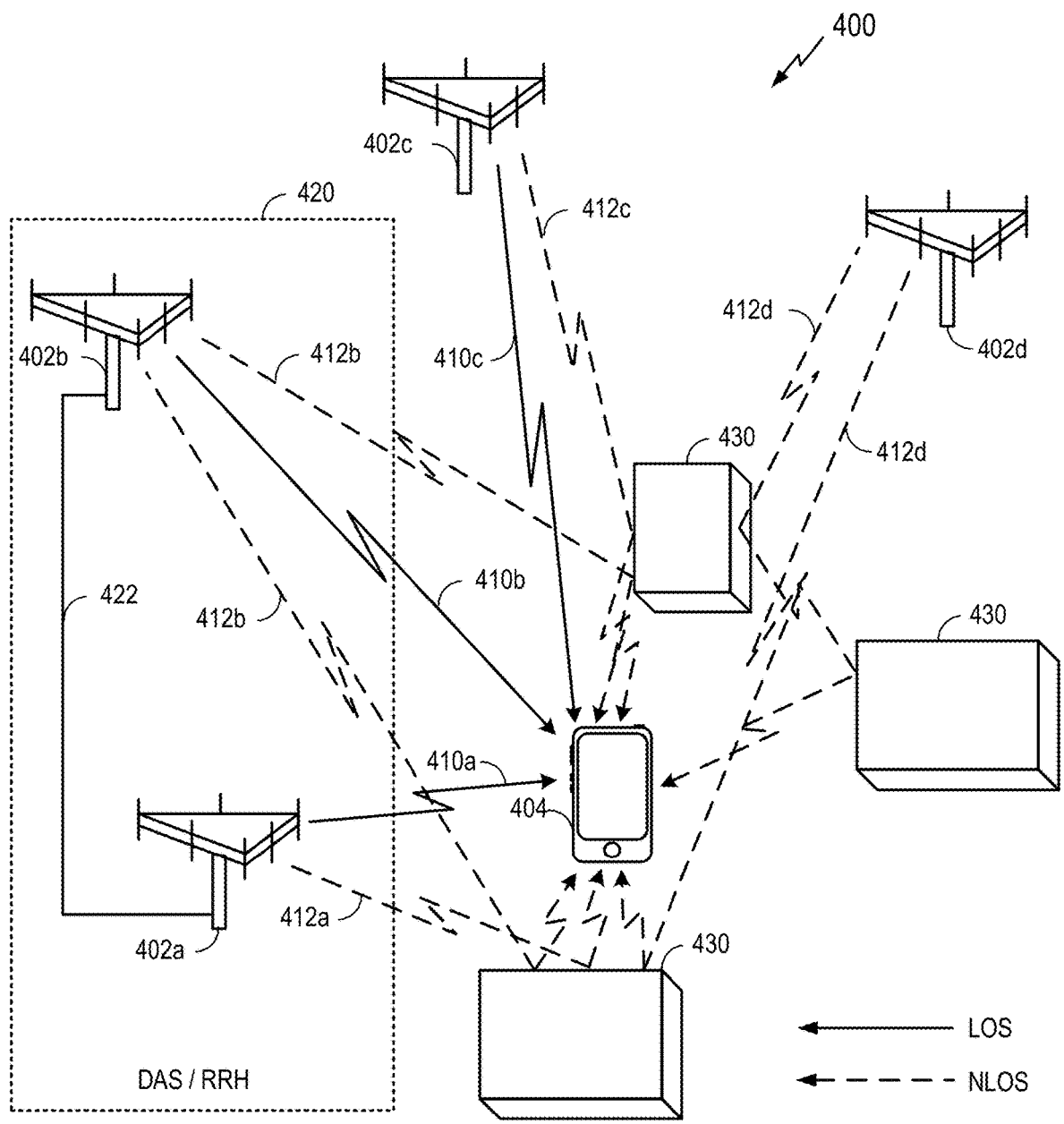
FIG. 4 illustrates an exemplary wireless communications system, according to various aspects of the disclosure.

FIG. 4 illustrates an exemplary wireless communications system 400 according to various aspects of the disclosure. In the example of FIG. 4, a UE 404, which may correspond to any of the UEs described above, is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402*a*-*d* (collectively, base stations 402), which may correspond to any combination of the base stations described above, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402. It should also be noted that two-dimensional and three-dimensional positions may be determined at different times. For example, the two-dimensional position may initially be determined, and at a later time, altitude of the device may also be determined.

To support position estimates, the base stations 402 may be configured to broadcast reference RF signals (e.g., positioning reference signals (PRS), cell-specific reference signals (CRS), channel state information reference signals (CSI-RS), synchronization signal blocks (SSBs), timing reference signals (TRS), etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that may be enabled by precise ToA/ToF, such as round-trip time estimation based methods. Note that the UE may be able to determine its own position from these measurements. Alternatively or in addition thereto, the UE may be configured or request that the network determine the UE's position based on the measurements. In other words, both network and UE based approaches are possible As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) or LMF (e.g., LMF 270) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The assistance data may be requested by the UE. Alternatively or in addition thereto, the assistance data may be provided to the UE unsolicited. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the network entity (e.g., location server, base station, LMF, etc.) can determine the distance between the UE 404 and the measured network nodes and the UE 404 or the network entity may calculate the location of the UE 404.

The term "position estimate" is used herein to refer to an estimate of a position for a UE 404, which may be geographic (e.g., may comprise a latitude, longitude, and possibly altitude) and/or civic (e.g., may comprise a street address, building designation, or precise point or area within or nearby to a building or street address, such as a particular entrance to a building, a particular room or suite in a building, a floor level in a building or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402*a* and 402*b* form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where a LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over a LOS path 410a and an NLOS path 412a, base station 402b transmitting over a LOS path 410b and two NLOS paths 412b, base station 402c transmitting over a LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 may be carrying RF signals that arrive at UE 404 with the highest signal strength (as indicated by, e.g., the reference signal received power (RSRP) or signal-to-interference-plus-noise ratio (SINR) in the presence of a directional interfering signal), whereas the beams of interest for position estimation may be carrying RF signals that excite the shortest path or LOS path (e.g., a LOS path 410). In some frequency bands and for antenna systems typically used, these will be the same beams. However, in other frequency bands, such as mmW, where typically a large number of antenna elements can be used to create narrow transmit beams, they may not be the same beams. Furthermore, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
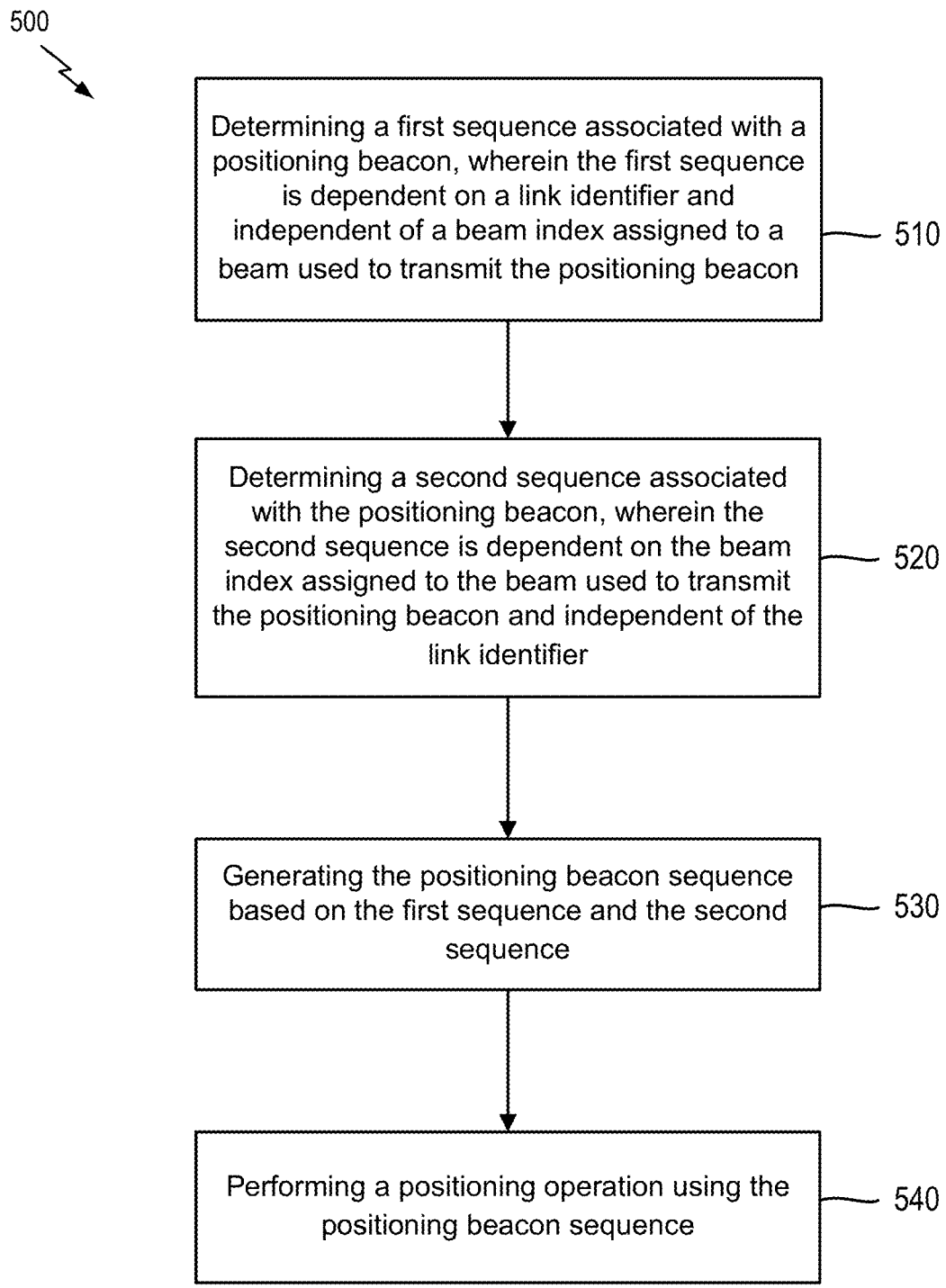
FIG. 5 illustrates an exemplary method for generating a positioning beacon sequence based on a link index and a beam index, according to various aspects of the disclosure.

According to various aspects, FIG. 5 illustrates an exemplary method 500 for generating a positioning beacon sequence based on a link index and a beam index. More particularly, as noted above, a network node (e.g., a cell) may generally transmit a reference RF signal or "positioning beacon" to a UE to support position estimation of the UE, wherein the positioning beacon is conventionally transmitted multiple times to improve detection, measurement accuracy, and interference resilience. In general, the network node may use different time and/or frequency resources and/or a different sequence for each positioning beacon transmission (e.g., to randomize interference). For example, the positioning beacon may comprise a pseudo-random sequence that is a nonlinear function that has terms with a product of a link index (e.g., a cell identifier such as a physical cell identifier (PCI)) and a time index (e.g., a slot number within a radio frame in conjunction with an OFDM symbol number within the slot). As will be apparent to those skilled in the art, the positioning beacon sequence may be generated using a pseudo-random sequence generator that is initialized with a suitable seed that depends on at least the link index and the time index such that each positioning beacon transmission is conventionally a different cell-dependent and time-dependent sequence. As such, each cell transmits a positioning beacon with a different unique sequence such that interference is randomized over multiple positioning beacon transmissions.

However, as further noted above, reference RF signals or positioning beacons may also be transmitted using different beams to further improve detection, measurement accuracy, and interference reliance and to account for possible channel variations due to the propagation characteristics of RF signals through multipath channels, which may include LOS and/or NLOS paths. As such, when positioning beacons are transmitted using different beams, there is an added dimension in that each positioning beacon may be transmitted on multiple beams, and for each transmit beam, the positioning beacon may be transmitted multiple times. In this context, a distinction may be made between repeating a transmission on the same transmit beam versus changing the transmit beam and then transmitting further positioning beacons.

In particular, each beam that the network node uses to transmit a positioning beacon may be associated with a respective beam index. For example, a beam index may be assigned to each beam that a network node transmits for purposes of distinguishing RF signals transmitted on one beam from RF signals transmitted on another beam, wherein the RF signals transmitted on at least some of the beams may be positioning beacons. Moreover, the RF signals associated with a particular beam may carry a beam index indicator, which may be derived from the transmission time of the RF signal (e.g., frame, slot, and/or OFDM symbol number). For example, the beam index indicator may be a three-bit field for uniquely distinguishing up to eight beams, although those skilled in the art will appreciate that more or fewer bits may be used to distinguish a different number of beams (e.g., a four-bit field may be used to distinguish up to sixteen beams, etc.). If two different RF signals share a common beam index, this would indicate that the different RF signals are transmitted using the same beam. If two different RF signals having different beam indices are received, this would indicate that the RF signals are transmitted using different beams (i.e., a particular beam is permitted to be associated with different beam indices). Another way to describe that two RF signals are transmitted using the same beam is to say that the antenna port(s) used for the transmission of the first RF signal are spatially quasi-collocated (QCLed) with the antenna port(s) used for the transmission of the second RF signal.

With respect to positioning beacons, the sequence associated therewith should be generated with statistical properties that result in generally identical performance irrespective of which "beam index" is used or otherwise selected to perform a measurement. For example, as noted above, a particular UE may select a particular beam of interest for position estimation based on which beam(s) carry RF signals that excite the LOS/shortest path. The fact that the beam that is useful for that particular UE has a given beam index versus another beam index should not have any material impact on the measurement. As such, the method 500 illustrated in FIG. 5 may ensure that there are no performance variations due to the beam index (or positioning beacon sequence), as any interference variability may instead be attributed to actual precoders and/or other variations in the physical channels associated with the different beams. In other words, over time, the method 500 shown in FIG. 5 may ensure that the interference randomization and inter-cell cross-correlation associated with the repetitions of one particular beam index is statistically identical to the interference randomization and inter-cell cross-correlation associated with the repetitions of any other beam indices. As such, the manner in which interference is randomized each time that a beam is transmitted may essentially be uniform across all beam indices.

According to various aspects, referring now to FIG. 5, the method 500 for generating the positioning beacon sequence based on a link index and beam index may comprise determining, at block 510, a first sequence associated with a positioning beacon, wherein the first sequence is dependent on a link identifier (e.g., a cell ID such as a PCI). The link identifier may be known to the UE, such as through broadcast channels, or explicitly provided to the UE by the base station. Notably, the first sequence that is determined at block 510 is independent of a beam index assigned to a beam used to transmit the positioning beacon. In some aspects, block 510 may be performed by controller/processor 375, memory 376 and/or TX processor 316 of base station 310 or may be performed by controller/processor 359, memory 360 and/or TX processor 368 of UE 350. Furthermore, the method 500 may comprise determining, at block 520, a second sequence associated with the positioning beacon, wherein the second sequence is dependent on the beam index assigned to the beam used to transmit the positioning beacon and independent of the link identifier. In some aspects, block 520 may be performed by controller/processor 375, memory 376 and/or TX processor 316 of base station 310 or may be performed by controller/processor 359, memory 360 and/or TX processor 368 of UE 350. In various aspects, the method 500 may comprise generating, at block 530, the positioning beacon sequence based on the first (link-dependent) sequence and the second (beam-dependent) sequence. In some aspects, block 530 may be performed by controller/processor 375, memory 376 and/or TX processor 316 of base station 310 or may be performed by controller/processor 359, memory 360 and/or TX processor 368 of UE 350. In various aspects, the method 500 may comprise performing, at block 540, a positioning operation using the positioning beacon sequence. In an aspect, where the method 500 is being performed by a transmitter device (whether a UE or a base station), performing the positioning operation may include transmitting the positioning beacon sequence to enable a receiver device to take a positioning measurement thereof. Where the method 500 is being performed by a receiver device (whether a UE or a base station), performing the positioning operation may include using the positioning beacon sequence as a reference to receive and measure (e.g., by comparing the received signal with the generated positioning beacon sequence) a positioning beacon transmission from a transmitter device, where the positioning beacon transmission comprises the positioning beacon sequence. In some aspects, block 540 may be performed by controller/processor 375, memory 376, TX processor 316, and/or RX processor 370 of base station 310 or may be performed by controller/processor 359, memory 360, TX processor 368, and/or RX processor 356 of UE 350. In an aspect, the link-dependent sequence and the beam-dependent sequence may be binary sequences such that the link-dependent sequence and the beam-dependent sequence may be provided to an exclusive or (XOR) function to generate the final beacon sequence. In another example, the link-dependent sequence and the beam-dependent sequence may be modulated (e.g., mapped into QPSK symbols) and the modulated sequences are then multiplied to obtain the final beacon sequence.

In general, the above description provides an overview of the manner in which the positioning beacon sequence is generated by combining a first sequence that depends on a link identifier and does not depend on a beam index with a second sequence that depends on the beam index and does not depend on the link identifier. However, at a high-level, the sequence generation may appear somewhat different. In particular, the beacon sequence may generally be a pseudo-random sequence (e.g., a Gold sequence, a maximum length, or "M," sequence, etc.) that is an affine function of a seed, wherein the seed is an initialization value given to a pseudo-random sequence generator. Gold sequences are a special set of binary pseudo-random sequences in which the correlation among member sequences is very small. Due to this property (small correlation), it is widely used as a scrambling code. M-sequences are a special type of linear feedback shift register (LFSR) sequence that gives the longest non-repeating sequence for a given number of shift registers (taps). As such, assuming that the beacon sequence generated at block 530 is such a pseudo-random sequence, the seed that is used to initialize the pseudo-random sequence generator may be structured to have at least one component that is dependent on the link identifier and independent of the beam index and at least one component that is dependent on the beam index and independent of the link identifier. For example, in various aspects, the seed may be structured as follows:

$$\text{seed} = f_1(c) \oplus f_2(b)$$

where c is the link (or cell) identifier, b is the beam index, $f_1(c)$ is a link identifier-dependent value expressed in binary (e.g., 128×c, 5×(c+1)$^2$+7, or another suitable binary value that depends on c), $f_2(b)$ is a beam index-dependent value expressed in binary (e.g., 2×b+1 expressed in binary), and $\oplus$ denotes exclusive or (XOR). Notably, however, in the example seed given above, $f_1(c)$ does not depend on b and $f_2(b)$ does not depend on c. Furthermore, assuming that non-zero bits of $f_1(c)$ and $f_2(b)$ are confined to disjoint bit locations (i.e., the bits that are impacted by $f_1(c)$ are disjoint from the bits that are impacted by $f_2(b)$), those skilled in the art will appreciate that the XOR function given above is equivalent to addition on real numbers. For example, supposing that b is a three-bit value, the following is true:

$$2^3 \cdot c \oplus b = 2^3 \cdot c + b$$

where $2^3 \cdot c$ shifts c by three values (i.e., appending three zeroes to c in the least significant area) and the resultant value is then XORed with b, which is the same as multiplying $2^3 \cdot c$ and then adding b to the resultant value. Accordingly, if $f_1(c)$ and $f_2(b)$ satisfy certain properties, addition may replace XOR in the seed given above.

According to various aspects, the above construction of the positioning beacon sequence may induce favorable structural properties to the XOR between different beacon sequences in the case of binary sequences or the Hadamard product in the case of different modulated sequences. Furthermore, having favorable properties for the XOR and/or Hadamard product between the different beacon sequences may imply favorable cross-correlation properties. For example, consider the XOR of two inter-cell beacon sequences that are associated with different link identifiers (e.g., $c_1$ and $c_2$). In such a case, the XOR of the two inter-cell beacon sequences for any given beam index b should be the same for all b. In other words, the XOR should not depend on the beam index, but should instead depend only on the different link identifiers; otherwise there would be undesirable variation in the inter-cell interference based on the beam index, which is simply a logical index assigned to a beam and therefore should not have any impact on performance. As such, constructing the positioning beacon sequence by combining a link-dependent (and beam-independent) sequence with a beam-dependent (and link-independent) sequence may result in the following property that induces favorable cross-correlation:

$$\text{seq}(c_1, b) \oplus \text{seq}(c_2, b) = \text{function}(c_1, c_2)$$

In particular, the property given above may indicate that the inter-cell cross-correlation is a function of the two cell identifiers, and not a function of which beam is assigned. This may advantageously reduce interference variability due to the transmitted sequence, as any variability in the inter-cell interference may instead be mostly from actual precoders (i.e., actual beams in use) and/or channel variations (e.g., the direction in which the beam(s) point, the channel conditions associated with the beam(s), etc.). As such, the beam index arbitrarily assigned to differentiate one beam from another does not cause any variability in the inter-cell interference in a synchronized deployment, which is the beneficial outcome.

Figure 6:
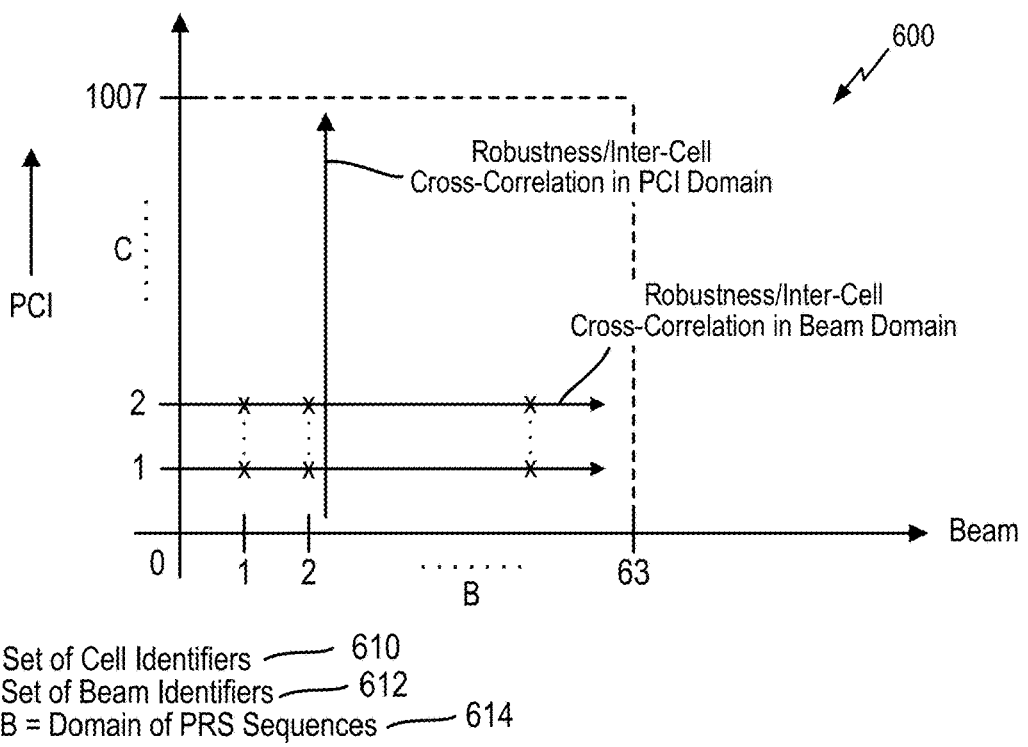
FIG. 6 illustrates an exemplary graph showing robustness/inter-cell cross-correlation in a domain of positioning beacon sequences, according to various aspects of the disclosure.

For example, according to various aspects, FIG. 6 illustrates an exemplary graph 600 showing robustness/inter-cell cross-correlation in a domain of positioning beacon sequences 614, which depends on a set of available cell identifiers (C) 610 and a set of available beam identifiers (B) 612. In particular, there may be roughly one thousand available cell identifiers 610 and sixty-four different beam identifiers 612, meaning that the domain of positioning beacon sequences 614 needs to have approximately sixty-four thousand different sequences. One way to achieve this design objective may be to create one unique sequence per cell (roughly one thousand unique sequences total) and one unique sequence per beam (sixty-four unique sequences total) through any suitable method such that the total unique sequences is $|C|+|B|$, where $|C|$ denotes the size of set C or the total number of cell identifiers 610 and $|B|$ denotes the size of set B or the total number of beam identifiers 612 (e.g., 1072 sequences in the illustrated example where set C includes 1008 cell identifiers and set B includes 64 beam identifiers). The total unique sequences that are needed can then be obtained from combining the cell-dependent (or link-dependent) sequence and the beam-dependent sequence, either through XORing the two sequences or modulating and multiplying the sequences.

Through the positioning beacon sequence design provided herein, the occurrence of high inter-cell cross-correlation is reduced compared to other possible schemes where the seed has terms that depend on the product of $c \in C$ and $b \in B$ (e.g., schemes that design $|C| \times |B|$ unique sequences), wherein the occurrence of adverse (i.e., high) inter-cell cross-correlation leads to difficulty in distinguishing the positioning beacons transmitted from different cells.

Figure 7:
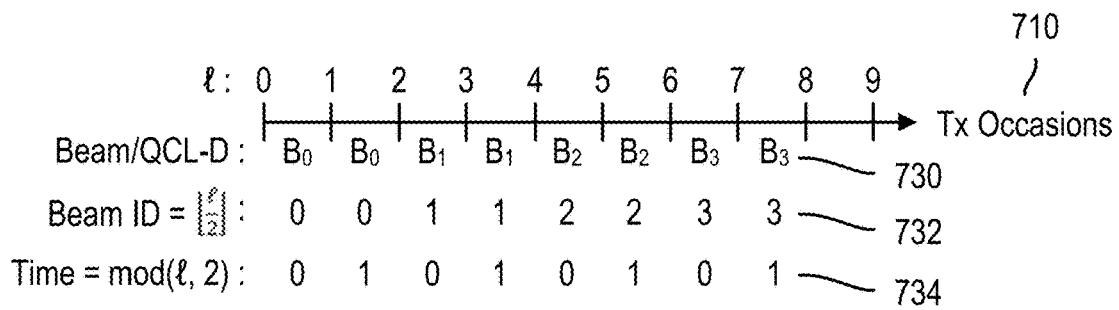
FIG. 7 illustrates an exemplary approach for deriving a beam index and a time index that can be used in combination with a link index to initialize a function used to generate a positioning beacon sequence, according to various aspects of the disclosure.
Figure 7:
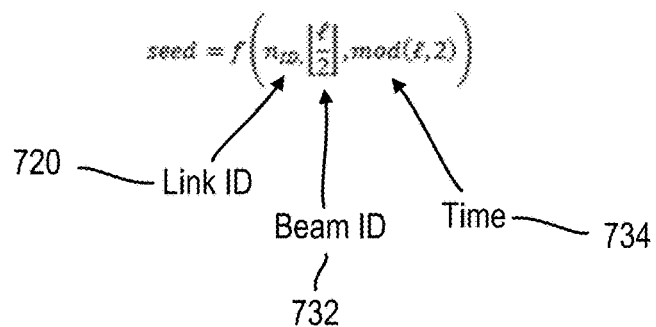

According to various aspects, FIG. 7 illustrates an exemplary approach for deriving a beam index 732 and a time index 734 that can be used in combination with a link index 720 to initialize a function used to generate a positioning beacon sequence as described in further detail above. For example, when two transmission instances of a positioning beacon are associated with the same beam index 732, this implies that the two transmission instances are spatially QCLed (i.e., the two transmission instances are using the same precoder or the same beam).

In various aspects, the beam index 732 can be derived from an index of a resource set (RS) that is spatially QCLed with the two transmission instances. For example, the positioning beacons may have the same beam as a given synchronization signal (e.g., synchronization signal number 7), in which case the given synchronization signal would be the beam index 732. Alternatively, in various aspects, the beam index 732 can be derived from a transmission time, as illustrated in FIG. 7. For example, suppose that a network node transmits four (4) beacon beams 730 denoted $B_0$, $B_1$, $B_2$, $B_3$ and each beacon beam 730 is transmitted twice. For simplicity, the two transmissions of the same beacon beam 730 may be assumed to be consecutive, although those skilled in the art will appreciate that the two transmissions need not be consecutive. Referring to FIG. 7, the transmission time (e.g., OFDM symbol index) may be broken up into transmission occasions 710, which may include two constituent parts. One constituent part may represent the beam index 732 and the other may represent the time index 734, wherein the distinction between the beam index 732 and the time index 734 may be made to treat the beam index 732 and the time index 734 differently in the seed used to initialize the pseudo-random sequence generator. In this context, the time index 734 can be treated in the conventional manner (e.g., as described in the Third Generation Partnership Project (3GPP) Technical Specification (TS) 38.211, which is publicly available and is incorporated by reference herein in its entirety) and have product terms with a link index 720 and/or the beam index 732, although the beam index 732 and the link index 720 remain separable. In other words, in the seed used to initialize the pseudo-random sequence generator, the link index 720 may or may not depend on the time index 734, and the beam index 732 similarly may or may not depend on the time index 734. However, in all cases, the link index 720 is independent of the beam index 732 and the beam index 732 is independent of the link index 720 to preserve the favorable statistical properties described in further detail above (e.g., reducing inter-cell cross-correlation).

According to various aspects, an example is provided assuming that there are eight (8) beams and each beam is repeated up to four (4) times, an example of a 31-bit seed having the above-mentioned properties may be as follows:

$$\text{seed} = (2^{13}(N_{symb}^{slot} n_s^{\mu} + t + 1)(2n_{ID} + 2^3 + 1) + 2^3 \cdot n_{ID} + n_{BeamId}) \bmod 2^{31}$$

where $t \in \{0, 1, 2, 3\}$ counts instances of the same beam, $n_{ID}$ is a link index configured by a network node, $n_{BeamId} \in$ {0, 1, ..., 7} is the beam index, $N_{symb}^{slot}$ is the number of OFDM symbols per slot, and $n_{s,f}^\mu$ is the slot number within a frame of slots. In this example, the seed uses arithmetic addition, wherein the beam index ($n_{BeamId}$) occupies the three least significant bits and the term that depends on $n_{ID}$ occupies the fourth least significant bit up to the thirty-first (most significant) bit.

Although the techniques disclosed herein have generally been described in terms of generating a positioning beacon sequence for a positioning beacon transmitted from a network node to a UE, those skilled in the art will appreciate that the disclosed techniques are equally applicable to transmissions from a UE to a network node (e.g., where the UE is capable of MIMO operation and/or beamforming when transmitting uplink signals that may be used in uplink-time difference of arrival (U-TDOA) positioning methods). Also, while beamforming is generally described above in context with transmit beamforming, those skilled in the art will appreciate that receive beamforming may also be used in conjunction with transmit beamforming in certain aspects.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a compact disk (CD), laser disc, optical disk, digital video disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for generating a positioning beacon sequence, comprising:
determining a first sequence associated with a positioning beacon, wherein the first sequence is dependent on a link identifier and independent of a beam index assigned to a beam used to transmit the positioning beacon;

determining a second sequence associated with the positioning beacon, wherein the second sequence is dependent on the beam index assigned to the beam used to transmit the positioning beacon and independent of the link identifier;

generating the positioning beacon sequence based on the first sequence and the second sequence; and performing a positioning operation using the positioning beacon sequence.

2. The method recited in claim 1, wherein the positioning beacon sequence comprises an exclusive or (XOR) of the first sequence and the second sequence.

3. The method recited in claim 1, wherein generating the positioning beacon sequence comprises:

modulating the first sequence;

modulating the second sequence; and multiplying the modulated first sequence and the modulated second sequence.

4. The method recited in claim 1, wherein generating the positioning beacon sequence comprises:

initializing a pseudo-random sequence generator using a seed that combines a first value dependent on the link identifier with a second value dependent on the beam index, wherein the first value does not depend on the beam index, and wherein the second value does not depend on the link identifier; and generating the positioning beacon sequence using the initialized pseudo-random sequence generator.

5. The method recited in claim 4, wherein the seed is computed based on an exclusive or (XOR) between the first value and the second value.

6. The method recited in claim 4, wherein the seed is computed based on an arithmetic addition of the first value and the second value.

7. The method recited in claim 4, wherein the seed further combines the first value dependent on the link identifier and the second value dependent on the beam index with a third value that depends on a transmission time for the positioning beacon.

8. The method recited in claim 4, wherein one or more of the first value or the second value further depends on a transmission time for the positioning beacon.

9. The method recited in claim 1, wherein the positioning beacon sequence is a Gold sequence.

10. The method recited in claim 1, wherein the positioning beacon sequence is a maximum length (M) sequence.

11. The method recited in claim 1, wherein the positioning beacon sequence is generated by a transmitter device, and wherein performing the positioning operation comprises transmitting the positioning beacon sequence.

12. The method recited in claim 1, wherein the positioning beacon sequence is generated by a receiver device, wherein performing the positioning operation comprises using the positioning beacon sequence as a reference to receive and measure a positioning beacon transmission from a transmitter device, and wherein the positioning beacon transmission carries the positioning beacon sequence.

13. An apparatus, comprising:

a memory; and at least one processor coupled to the memory, the at least one processor configured to:

determine a first sequence and a second sequence associated with a positioning beacon, the first sequence dependent on a link identifier and independent of a beam index assigned to a beam used to transmit the positioning beacon, the second sequence dependent on the beam index and independent of the link identifier, generate a positioning beacon sequence based on the first sequence and the second sequence, and perform a positioning operation using the positioning beacon sequence.

14. The apparatus recited in claim 13, wherein the positioning beacon sequence comprises an exclusive or (XOR) of the first sequence and the second sequence.

15. The apparatus recited in claim 13, wherein the memory and the at least one processor are further configured to:

modulate the first sequence;

modulate the second sequence; and multiply the modulated first sequence and the modulated second sequence to generate the positioning beacon sequence.

16. The apparatus recited in claim 13, wherein the memory and the at least one processor are further configured to:

initialize a pseudo-random sequence generator using a seed that combines a first value dependent on the link identifier with a second value dependent on the beam index, wherein the first value does not depend on the beam index, wherein the second value does not depend on the link identifier, and use the initialized pseudo-random sequence generator to generate the positioning beacon sequence.

17. The apparatus recited in claim 16, wherein the seed is computed based on an exclusive or (XOR) between the first value and the second value.

18. The apparatus recited in claim 16, wherein the seed is computed based on an arithmetic addition of the first value and the second value.

19. The apparatus recited in claim 16, wherein the seed further combines the first value dependent on the link identifier and the second value dependent on the beam index with a third value that depends on a transmission time for the positioning beacon.

20. The apparatus recited in claim 19, wherein one or more of the first value or the second value further depends on the transmission time for the positioning beacon.

21. The apparatus recited in claim 13, wherein the positioning beacon sequence is a Gold sequence.

22. The apparatus recited in claim 13, wherein the positioning beacon sequence is a maximum length (M) sequence.

23. The apparatus recited in claim 13, wherein the apparatus comprises a transmitter device, and wherein the memory and the at least one processor being configured to performing the positioning operation comprises the memory and the at least one processor configured to cause the apparatus to transmit the positioning beacon sequence.

24. The apparatus recited in claim 13, wherein the apparatus is a receiver device, wherein the memory and the at least one processor being configured to perform the positioning operation comprises the memory and the at least one processor being configured to use the positioning beacon sequence as a reference to receive and measure a positioning beacon transmission from a transmitter device, and wherein the positioning beacon transmission carries the positioning beacon sequence.

25. An apparatus, comprising:

means for determining a first sequence associated with a positioning beacon, wherein the first sequence is dependent on a link identifier and independent of a beam index assigned to a beam used to transmit the positioning beacon;

means for determining a second sequence associated with the positioning beacon, wherein the second sequence is dependent on the beam index assigned to the beam used to transmit the positioning beacon and independent of the link identifier;

means for generating a positioning beacon sequence based on the first sequence and the second sequence; and means for performing a positioning operation using the positioning beacon sequence.

26. The apparatus recited in claim 25, wherein the positioning beacon sequence comprises an exclusive or (XOR) of the first sequence and the second sequence.

27. The apparatus recited in claim 25, wherein the means for generating the positioning beacon sequence comprises:
means for modulating the first sequence;
means for modulating the second sequence; and
means for multiplying the modulated first sequence and the modulated second sequence.

28. The apparatus recited in claim 25, wherein the means for generating the positioning beacon sequence comprises:
means for initializing a pseudo-random sequence generator using a seed that combines a first value dependent on the link identifier with a second value dependent on the beam index, wherein the first value does not depend on the beam index, and wherein the second value does not depend on the link identifier; and
means for generating the positioning beacon sequence using the initialized pseudo-random sequence generator.

29. A non-transitory computer-readable medium having computer-executable instructions recorded thereon, the computer-executable instructions configured to cause a processor to:
determine a first sequence associated with a positioning beacon, wherein the first sequence is dependent on a link identifier and independent of a beam index assigned to a beam used to transmit the positioning beacon;
determine a second sequence associated with the positioning beacon, wherein the second sequence is dependent on the beam index assigned to the beam used to transmit the positioning beacon and independent of the link identifier;
generate a positioning beacon sequence based on the first sequence and the second sequence; and
perform a positioning operation using the positioning beacon sequence.

30. The non-transitory computer-readable medium recited in claim 29, wherein the positioning beacon sequence comprises an exclusive or (XOR) of the first sequence and the second sequence.

* * * * *